(No Model.)
J. G. HUMPHREY & E. F. MURDOCK.
BICYCLE BRAKE.
No. 585,328.  Patented June 29, 1897.
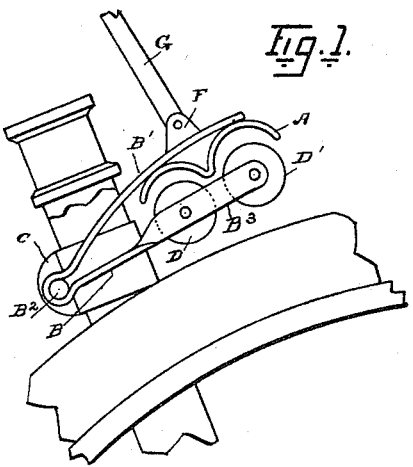
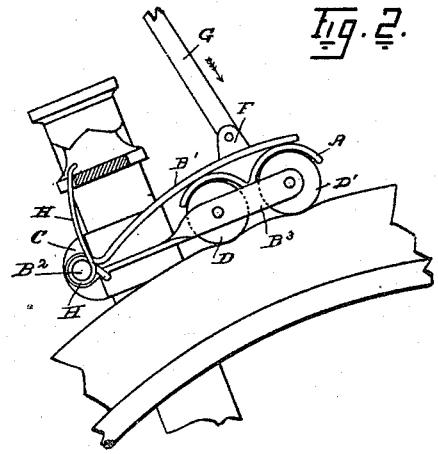
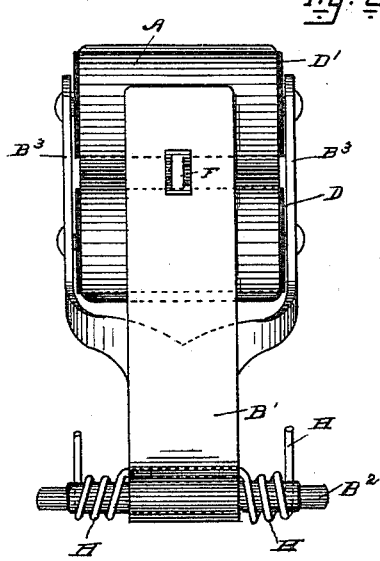
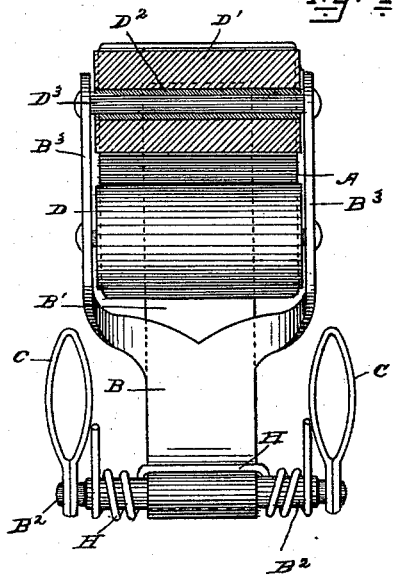
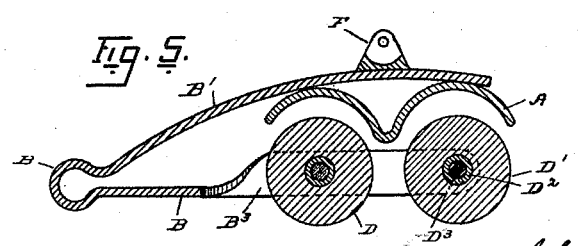
WITNESSES:
Baldwin Vale
Jno. S. Robbins,
INVENTORS,
John G. Humphrey
and Edwin F. Murdock
BY
E. F. Murdock
ATTORNEY.

UNITED STATES PATENT OFFICE.

JOHN G. HUMPHREY AND EDWIN F. MURDOCK, OF OAKLAND, CALIFORNIA.

BICYCLE-BRAKE.

SPECIFICATION forming part of Letters Patent No. 585,328, dated June 29, 1897.

Application filed July 6, 1896. Serial No. 598,245. (No model.)

*To all whom it may concern:*

Be it known that we, JOHN G. HUMPHREY and EDWIN F. MURDOCK, citizens of the United States, residing at Oakland, in the county of Alameda and State of California, have invented certain new and useful Improvements in Brakes for Bicycles; and we do hereby declare the following to be a full, clear, and exact description of said invention, such as will enable others skilled in the art to which it most nearly appertains to make, use, and practice the same.

This invention relates to improvements in brakes for wheels, and more particularly to brakes for bicycles.

The particular use for which this invention is designed is that of its application to pneumatic tires or tires of a fragile and easily-destructible nature.

Heretofore there has been used devices in which the abrasion incident to setting the brake has been partially avoided by the employment of rollers constructed of hard materials which are thrown in contact with and rotated by the tire of the wheel. The braking influence has been produced by checking the rotation of the rollers and through them the wheel. The check has been given the rollers by producing friction on the bearings thereof and by pressing over the rollers a friction-shoe. These constructions have been objectionable for the reason that the sudden application of the brake causes jamming of the rollers, which the friction of the tire on the wheel is unable to overcome, and abrasion more injurious than that produced by the ordinary "spoon" results. Again, the pressure required to stop the wheel when applied by a shoe on top the hard rollers has equalized the frictional contact and made the liability to slipping of the rollers on the tire and of the rollers on the shoe equal. Again, the rollers employed in this class of brakes have been such as contorted the tire and produced thereon strains not calculated in their construction, such as rollers striking on the side of the tire and rollers side by side, both of which are liable to break the tire in the center of the tread by creasing it continuously at that point.

It is to overcome the above-mentioned objections which is the object of the present invention, which consists in the construction and arrangement of rollers formed of a composition of equal or greater adhesive properties than the surface of the tire and in providing a shoe to strike over and upon the rollers to produce friction thereon, the shoe being constructed of material having a less adhesive property than the tire, whereby the rollers are compelled to turn under all pressures and friction of the shoe.

It also consists in constructing the hanger in such manner as to maintain the shoe and rollers separated by spring force of desired power, whereby the force needed to compress the shoe against the rollers after the rollers are in contact with the tire of the wheel is transferred to the contact between the tire and the under side of the rollers, producing that much greater force in the contact between the tire and rollers in excess of that between the rollers and shoe.

In the drawings, Figure 1 is a side view of the invention in its normal or released position, the near side of the fork of the bicycle being removed and the supporting coil-spring being omitted. Fig. 2 is a similar view showing the brake in operation with the supporting coil-spring in position. Fig. 3 is a plan view of the invention. Fig. 4 is a plan view of the same from beneath. Fig. 5 is a longitudinal section through the brake, the pivot and supporting coil-spring being omitted.

To facilitate the description of the invention with reference to the drawings, we will let the letter A designate a brake-shoe. This is preferably suspended forward over the wheel by the spring-arm B' of the hanger B. The hanger B is mounted in journals in clips C by means of the pivot $B^2$. The rollers D D' are mounted in the bifurcated ends $B^3$ of the hanger B. The spring-arm B' and hanger are integrally connected, so that the full force of the spring-arm maintains the shoe A and the rollers apart until overcome by the pressure applied downward on the shoe. By this construction the preliminary action of setting the brake has the effect of causing the rollers to strike and press upon the tire with the full force of the spring B' in advance of the shoe A being depressed upon the rollers, and, further, of maintaining an extra pressure of the rollers on the tire over and above the pressure of the shoe on the rollers—that is to say, the pressure applied in setting the brake will be partly expended in overcoming the spring-tension. This will produce an extra pressure on the tire and the under part of the rollers, which will insure the turning of the rollers under all ordinary pressures of the brake or, in other words, will prevent jamming of the rollers.

For convenience of construction the spring-arm and carrier-frame are formed from one piece, the pivot $B^2$ being clamped within the bent metal. The journal sides $B^3$ are formed by cutting the metal of the hanger lengthwise and separating and bending them in form, as shown, to receive and form bearings for the rollers D D'.

The rollers D D' are preferably constructed of rubber for the reason that the casing of these tires are faced mostly with rubber or some fabric, and the adhesion between the rollers and the tire is thereby of the greatest possible degree at the point of their contact. We by this means insure against the refusal of the rollers to rotate when suddenly applied and the consequent slipping and abrasion of the tire.

To mount the rollers, they are provided with metal bushings $D^2$, driven tightly into perforations formed in the rollers, and which bushings form bearings to receive the roller-shafts $D^3$. This bushing is provided so that the wear on the rollers shall be on their outer surface against the shoe A and be in no way checked by wear on the center of the rollers or their bearings.

It is to provide added friction-surface that the shoe A is curved as shown. This may be increased or diminished at will by accenting or diminishing the curve.

It is preferred to use this brake in the form known as a "hand-brake," and such form is shown in the drawings, where the shoe is shown as provided with the connecting-lug F, to which the plunger-bar G is attached.

The rollers and shoe are maintained in a raised position by the supporting coil-spring H, which is bent around the pivot $B^2$ and under the hanger, and the free ends are extended behind the forks or over the crown of the bicycle.

In its operation the preliminary force is applied in overcoming the supporting coil-spring H, which permits the brake to rotate on the pivot $B^2$. When the rollers D D' first strike the tire, the shoe A is as far removed as originally. The continued application of the braking power forces the shoe down on the rollers against the expansion of the spring-arm B' until the shoe rests firmly on the rollers. Before the shoe reaches the rollers, however, the latter have started to rotate and the effect of the shoe is to retard them. In producing this effect, however, the rollers are forced against the tire of the wheel with the full force of the spring-arm B', while the pressure of the shoe on the rollers is lessened proportionately thereby. Thus the adhesion between the rollers and tire is greater than between the rollers and shoe. This insures the revolving of the rollers under all conditions of pressure by putting the greater strain on the one side of their bearings than on the other.

By using rollers which extend across the full tread of the wheel the tire is flattened, when the pressure is applied in the same manner as that produced by the pressure on the ground.

Having thus described this invention, what is claimed is—

In a brake for a bicycle a brake-shoe in combination with rollers interposed between said shoe and the tire of the wheel, a hanger formed of spring metal bent back on itself and one end adapted to carry journals for the said rollers, and the other a brake-shoe, the one end supporting the said shoe and the other the said rollers, a supporting-spring to lift the said hanger from the wheel, and suitable devices for depressing the said rollers and compressing the said hanger to rest the shoe on the rollers, substantially as described.

In testimony whereof we have hereunto set our hands this 4th day of May, 1896.

JOHN G. HUMPHREY.
EDWIN F. MURDOCK.

Witnesses:
BALDWIN VALE,
CHAS. J. ARMBRUSTER.